CORRUGATED FABRIC AND METHOD OF MAKING THE SAME

Original Filed Sept. 8, 1948

INVENTOR.
BOUTWELL H. FOSTER
BY
Charles C. Willson
ATTORNEY

United States Patent Office

Re. 24,007
Reissued May 24, 1955

24,007

CORRUGATED FABRIC AND METHOD OF MAKING THE SAME

Boutwell H. Foster, Maplewood, N. J., assignor to United States Rubber Company, New York, N. Y., a corporation of New Jersey Original No. 2,607,104, dated August 19, 1952, Serial No. 48,196, September 8, 1948. Application for reissue January 5, 1954, Serial No. 402,423

9 Claims. (Cl. 28—72)

Matter enclosed in heavy brackets [ ] appears in the original patent but forms no part of this reissue specification; matter printed in italics indicates the additions made by reissue.

This invention relates to corrugated fabrics and method of making the same, and more particularly to two-ply and three-ply woven corrugated fabrics that are highly resilient in resisting lateral compression.

The primary object of the present invention is to provide a durable corrugated fabric that is highly resilient or elastic to resist lateral compression, and is capable of returning repeatedly to its hollow corrugated shape after it is compressed. Such a fabric permits a free flow of air along its corrugated channels, and if desired from one channel to another. It has good heat insulating properties to provide protection from heat or cold, and its insulating properties may be increased by filling its channels with insulating fibers or other insulating material. Furthermore the elastic resistance of this fabric to lateral compression gives it a cushioning action comparable to that of a sponge rubber.

The uses for this corrugated fabric are numerous. It may be worn next to the body as underwear in arctic clothing. It can be used as a cushioning insole in shoes, and to line the soles and upper part of boots such as mukluks worn in arctic climate. It may also be used in outer garments worn in cold climates, for example in a parka, and its corrugated channels may be filled with insulating materials such as glass fibers, textile fibers, feathers or foamed rubberlike material, or the fabric may be used with these hollow channels unfilled.

When this material is worn as an undergarment under extreme arctic conditions the wearer may be kept warm by supplying warm air from a suitable source to the garment made of this corrugated fabric so that the warm air will pass through the corrugated channels to heat the body of the wearer. On the other hand if such a garment is worn where the temperature is very high the body of the wearer may be cooled by forcing cooled air through the channels of the garment made of this corrugated fabric. The present material may also be used to make a yielding inner sole or hat band.

In addition to the above mentioned uses in the clothing field, the present corrugated fabric may be used as rug underlay; as a sound absorbing material; and as means for circulating conditioned air for heating or cooling purposes. Also several layers of this material may be placed one on top of the other to form a pillow or mattress, or a single layer may be used as a yielding cover for a sponge rubber cushion or mattress.

The two-ply and three-ply corrugated resilient fabrics contemplated by the present invention are easy to make. The three-play fabric comprising a top fabric, bottom fabric and much stiffer and resilient intermediate fabric can be woven on a loom in a single operation. To accomplish this it is necessary to so construct the top and bottom fabrics that they can be shrunk or contracted in one direction to a pronounced degree upon the application of heat, while the stiffer and more resilient intermediate fabric should not shrink under the heat treatment, so that the shrinking of the outer fabrics will corrugate the intermediate fabric. It is important in carrying out the present invention that the outer fabrics when shrunk shall remain shrunk to hold the intermediate fabric corrugated. It is also important in the three-ply construction that the intermediate fabrics be secured to the top fabric and to the bottom fabric along spaced rows, and that the rows of the bottom fabric be positioned about half way between those of the top fabric. The purpose of this is to secure the intermediate fabric to the outer fabrics in such a manner as to cause the intermediate fabric to be corrugated when the top and bottom fabrics are shrunken, and also to have the corrugated loops securely attached to the top and bottom fabrics. This causes the loops of the intermediate fabric to be uniformly spaced and firmly held in place, and these loops hold the top and bottom fabrics spaced apart with a resilient cushion-like action. The intermediate fabric preferably is formed with an open weave that will permit air passing through one channel to pass laterally from one channel to another, so that if one channel is blocked by being compressed the air can readily pass laterally to another channel. When a two-ply construction is desired it is formed by simply omitting one of the outer shrinkable fabrics of the three-ply construction.

In making the three-ply construction the top and bottom fabrics may have the same construction, and may be woven of cotton yarn or other suitable yarns, but it is important that those yarns that extend in the direction in which the fabric is to be shrunken have associated therewith heat-contractable filaments, which when heated will contract or shrink the fabric in which they are woven about 50% and hold such fabric shrunk. The resilient intermediate fabric should not shrink at this temperature, so that when the outer fabrics are shrunken and held in the shrunken condition by the heat contractable filaments, the non-shrinking intermediate fabric will be forced into corrugated loops that are firmly anchored alternately to the top and lower fabric.

These three fabrics may be woven simultaneously on a loom of well known construction, and the rows which secure the intermediate fabric alternately to the top and bottom fabric may be produced by carrying a few yarns from one fabric into the weave of the adjacent fabric to secure the two fabrics together in a well known manner. Likewise in the two-ply construction the two fabrics are woven simultaneously and secured together by the weave along spaced rows.

The above and other objects of the corrugated fabric of the present invention and method of making the same will be further understood from the following description when read in connection with the accompanying drawing, wherein Fig. 1 is a perspective view of a triple-ply woven fabric as it appears when it comes off the loom.

Fig. 2 is a perspective view of the triple-ply fabric of Fig. 1 after it has been heat treated to shrink the outer fabrics and corrugate the intermediate fabric.

Fig. 3, on a larger scale, is a side view of a heat shrinkable yarn such as is woven into the top and bottom fabrics in the direction in which these fabrics are to be shrunken.

Figure 3:
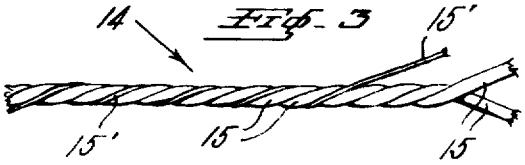
Figure 7:
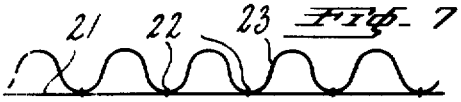
Fig. 7 is a sectional view of a two-ply fabric constructed in accordance with the present invention.

The three-ply or triple-ply fabric shown in all views of the drawing except Figs. 3 and 7 comprises a top fabric 10, a bottom fabric 11, and an intermediate or inner fabric 12. The outer fabrics 10 and 11 are preferably identical as to weave and as to the warp and weft yarns used in the weave. The intermediate fabric 12 is preferably woven of much stiffer and more resilient yarns than those used in the top and bottom fabrics, since it is the yarns of the intermediate fabric that are relied upon to impart to the finished corrugated fabric the desired high resiliency that resists lateral compression of the corrugated fabric.

The top and bottom fabrics may be formed primarily of ordinary cotton yarns, and all of the warp yarns of the fabrics 10 and 11 may be the ordinary cotton warp yarns 13. The weft yarns 14 of the fabrics 10 and 11 however are of special construction so that they will cause the fabric to shrink a substantial amount in the direction of the wefts under the application of heat. Therefore the weft yarns 14 are preferably constructed as shown in Fig. 3 in which the weft yarn is formed of two cotton yarns 15 and a much smaller heat shrinkable resinous filament 15' such as Vinyon and which will shrink or contract to a pronounced degree under the application of heat. These yarns 15 and filament 15' are twisted together as shown. Should a more dense fabric be desired at 10 and 11 the warp may be formed of cotton alone as above described while the weft is formed of Vinyon alone, or similar shrinkable resinous filaments.

This resinous filament 15' should be an oriented synthetic filament which will contact greatly, say from 50 to 80 percent upon the application of heat at a temperature well below its softening or flow temperature, and which is also below a temperature that would injure or shrink appreciably the intermediate sheet 12. The pronounced contractile property of the thermoplastic filament 15' depends on what is known as "elastic memory," that is the property of many high molecular weight polymers of returning, when heated, to a shorter length from which it was drawn out at some previous stage in its manufacture.

Examples of heat shrinkable synthetic filaments that may be used are:

1. Vinyon, an oriented copolymer of vinyl chloride (88 to 90%) with vinyl acetate (10 to 12%);

2. An oriented polymerized ethylene (polyethylene).

Examples of non-heat shrinkable synthetic filaments that may be used are:

1. Saran, an oriented copolymer of vinylidene chloride with a small proportion (about 4 to 10 generally about 5% of vinyl chloride);

2. Dacron, an oriented polyester of terephthalic acid with ethylene glycol.

Figure 2:
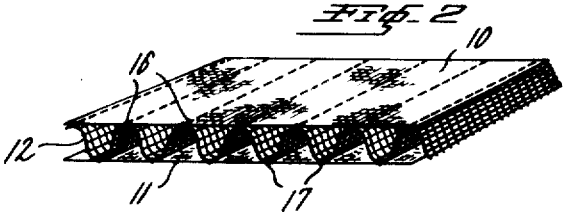

The temperature range over which the greater part of the shrinkage takes place varies with the particular variety of thermoplastic yarn employed, and is a well known characteristic of each type of yarn. As the upper end of the shrinkage temperature range is approached the amount of further shrinkage taking place decreases and finally becomes practically nil. For example, in the case of Vinyon, which works very well, a greater part of the shrinkage takes place in the range from 160° F. to 175° F., and as the temperature rises above 175° F. the further shrinkage becomes less and less and virtually no further change in length occurs above 210° F., which is the highest temperature to which the triple-ply fabric of the present invention is subjected. The temperature used should not be sufficient to destroy or melt the filament 15', since this shrunken filament is relied upon to hold the outer fabrics 10 and 11 in the contracted condition in which they are shown in Fig. 2.

The intermediate fabric 12 is preferably woven entirely of a relatively stiff and resilient synthetic filament yarn such as Saran, a copolymer of vinylidene chloride and vinyl chloride containing less than 10% plasticizer. Saran does not shrink appreciably at temperatures below 212° F. While the fabric 12 is preferably woven entirely of Saran, Velon, a plasticized vinylidene chloride resinous filament may be used, as may also a nylon monofilament. This fabric 12 should be woven of yarns that are large enough to give the desired resiliency and stiffness to the finished corrugated fabric, and such fabric is preferably constructed with an open weave so that air traveling in one corrugated channel may pass readily from one channel to another.

The three fabrics 10, 11 and 12 are preferably woven simultaneously on a loom, and the top fabric 10 and intermediate fabric 12 are woven together lengthwise of the fabric along the spaced rows 16. The intermediate fabric 12 and bottom fabric 11 are similarly woven together lengthwise of the fabric along the spaced rows 17, and the rows 17 are preferably so positioned that they lie half-way between the rows 16 as will be apparent from the drawing.

Figure 1:
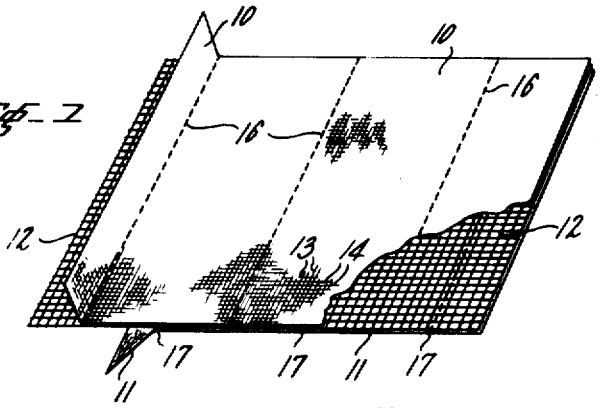

When the fabric of the present invention comes off of the loom it will appear as shown in Fig. 1 with the fabrics 10, 11 and 12 contacting one another. The outer fabrics 10 and 11 are then shrunken weft-wise of the fabric by immersing the fabric in hot water having a temperature of about 200° F. for a few minutes. This will cause the resinous filaments 15' wrapped around the yarns 15 to shrink the plied yarns 14 about 50% to form the construction of Fig. 2. Since the stiff intermediate fabric 12 is not shrunken by this hot water treatment it will buckle to form the corrugations shown in Fig. 2, which corrugations are anchored to the top sheet 10 along the rows 16 and to the bottom sheet 11 along the rows 17.

The triple-ply corrugated fabric shown in Fig. 2, is highly resilient to resist lateral compression, and will resemble a sponge rubber sheet in its soft resilient properties to expand laterally after being compressed. This resiliency is due largely to the construction described in which the sheets 10 and 11 when once shrunken will not stretch to allow the sheet 12 to straighten out. The construction of Fig. 2 having the corrugated passages extending warp-wise thereof will permit the free flow of air length-wise of these passages, and if the fabric is compressed at any point to close a corrugated passage the air can pass laterally through the open weave of the sheet 12 and around such obstruction.

Figure 4:
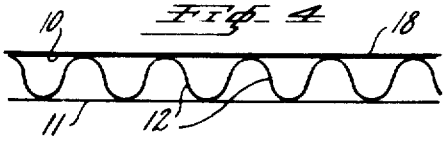
Fig. 4 is a sectional view of a fabric such as shown in Fig. 2 but having the upper face thereof covered with a water-proof coating.

In some cases it may be desirable to render one or possibly both of the outer sheets 10 and 11 impervious to air. Such a construction is shown in Fig. 4 in which the outer face of the sheet 10 is shown as covered with the coating 18 of latex. In this construction of Fig. 4 the lower sheet 11 is pervious to air while the upper sheet 10 is impervious to air or moisture.

Figure 5:
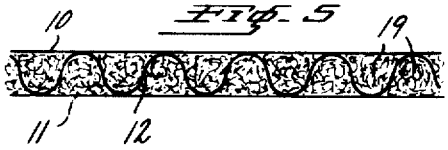
Fig. 5 is a sectional view of a fabric such as shown in Fig. 2 but having the corrugated channels filled with an insulating material such as textile or glass fibers.
Figure 6:
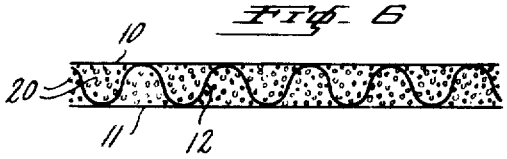
Fig. 6 is a sectional view of a fabric similar to that shown in Fig. 2 in which the corrugated channels are filled with a blown rubber-like insulating material.

In some cases it may not be desirable to have air flow freely along the corrugated loops of the fabric of Fig. 2 in which case these loops may be filled with insulating fibers such as glass or textile fibers 19 as shown in Fig. 5 to thereby improve the heat insulating properties of this corrugated fabric. Instead of filling the corrugated passages with fibers as shown in Fig. 5, it may be desirable to introduce in these corrugated passages strands of blowable rubber-like material 20, such for example as strips of vinyl chloride containing a blowing agent, so that when the fabric is heated to shrink the sheets 10 and 11 weft-wise as above described, the vinyl chloride strips 20 will blow to fill up these corrugated passages and thereby provide a lightweight sheet material having excellent resilient properties.

The two-ply corrugated fabric of Fig. 7 is produced by employing a shrinkable fabric 21 that is similar to either fabric 10 or 11 above described and by weaving it along the rows 22 to a much stiffer fabric 23 that is similar to the fabric 12.

In order that a better understanding may be had of the present invention, the following tables are given of one embodiment of the present invention, and show the properties of the original fabric as it comes off the loom, and of the finished fabric after it has been heat-shrunken or condensed by hot water.

TABLE I

| | Off the loom | Finished |
|---|---|---|
| 1. Ounces per sq. yd. | 14.0 | 29.1 |
| 2. Warps per in., Top | 22 | 42 |
| 3. Warps per in., Bottom | 22 | 42 |
| 4. Warps per in., Inner | 22 | 23 |
| 5. Wefts per in., Top | 36 | 40 |
| 6. Wefts per in., Bottom | 36 | 40 |
| 7. Wefts per in., Inner | 18 | 20 |
| 8. Warp yarn, Top | 20 S/2 cotton | |
| 9. Warp yarn, Bottom | 20 S/2 cotton | |
| 10. Warp yarn, Inner | 1,400 den. Saran | |
| 11. Weft yarn, Top | 2-30 S/1 cotton twisted with 1-40 den. Vinyon 15 T. P. I. | |
| 12. Weft yarn, Bottom | Same as top | |
| 13. Weft yarn, Inner | 1,400 den. Saran | |

TABLE II

Some of the physical properties of the finished fabric shown in Fig. 2 are:

| | | |
|---|---|---|
| 1. Strength, warp | lbs. | 156 |
| 2. Strength, weft | lbs. | 134 |
| 3. Air permeability | cu. ft. per sq. ft. per. min. | 89 |
| 4. Compressibility | per cent | 30.3 |
| 5. Resilience | do | 65.2 |
| 6. Per cent cotton | do | 47.3 |
| 7. Per cent Vinyon | do | 2.9 |
| 8. Per cent Saran | do | 49.8 |

The compressibility and resiliency given in Table II are found as follows. A sample of the fabric is placed under load, the load increasing in fractions of a pound in this sequence: 0.1, 0.2, 0.35, 0.5, 0.75, 1.0, 1.5 and 2.0 lbs./sq. in. Thickness of the sample is read at each loading. The load is then removed in the reverse sequence until the sample is under a pressure of 0.1 lb./sq. inch. Compressibility is taken to be $$\frac{A-B}{A}\times 100$$

where A is the original thickness at the 0.1 lb. load and B is the thickness at the 2.0 lb. load. Resiliency is $$\frac{C-B}{A-B}\times 100$$

where A and B are as expressed above and C is the thickness at the final load of 0.1 lb./sq. in. after removing the load to that point.

It will be seen from the foregoing that the triple-ply corrugated fabric contemplated by the present invention may be used in some fields with its channels open so that air may flow therethrough and in other fields with these channels closed, and due to the relative stiffness of the inner fabric 12 a resilient corrugated fabric, having excellent cushion-like resistance to lateral compression can be produced. This resistance to such lateral compression may be varied within a wide range by varying the size, number and stiffness of the warp and weft yarns employed in the inner fabric 12.

*The fabrics of this invention are characterized by their resiliency, and by their ability to resist lateral compression. The fabrics 12 and 23 in the constructions disclosed are capable of resisting lateral compressive forces without completely flattening out the corrugations, and they are capable of returning repeatedly to their original shape after being compressed partially by a lateral load.*

Having thus described my invention, what I claim and desire to protect by Letters Patent is:

1. A [triple-ply] *multi-ply* corrugated fabric, comprising a woven [top and bottom] *first* fabric [both] containing oriented synthetic filaments, a much stiffer resilient but non-elastic [intermediate] *second* fabric formed largely of coarse synthetic yarns and woven to the [top] *first* fabric along spaced rows [and to the bottom fabric along other spaced rows that lie about half way between the top rows], the [top and bottom] *first* fabric[s] being permanently contracted a substantial amount by said filaments that are heat shrunken in a direction to draw said rows towards each other so that the resilient non-contracted [intermediate] *second* fabric is held corrugated by the contracted [top and bottom] *first* fabric[s], and this corrugated fabric holds the [top and bottom] *first* fabric[s] yieldingly spaced [apart] *from the opposite surface of the corrugated fabric* with sufficient strength to keep the corrugated passages open when the fabric is subjected to a substantial pressure.

2. A triple-ply corrugated fabric, comprising an open-weave top fabric and an open-weave bottom fabric both containing oriented synthetic filaments, a much stiffer open-weave, non-elastic intermediate fabric formed largely of coarse synthetic yarns and woven to the top fabric along spaced rows and to the bottom fabric along other spaced rows that lie about half-way between the top rows, the top and bottom fabrics being permanently contracted a substantial amount by said filaments that are heat shrunken in a direction to draw said rows towards each other so that the resilient non-contracted intermediate fabric is held corrugated by the contracted top and bottom fabrics, and this corrugated fabric holds the top and bottom fabrics yieldingly spaced apart with sufficient strength to keep a weight of [one-half] *two* pounds per square inch from *completely* flattening out the corrugations.

3. A triple-ply corrugated fabric, comprising a woven top and bottom fabric both containing oriented synthetic filaments, a much stiffer resilient but non-elastic intermediate fabric formed largely of coarse synthetic yarns and woven to the top fabric along spaced rows and to the bottom fabric along other spaced rows that lie about half-way between the top rows, the top and bottom fabrics being permanently contracted a substantial amount by said filaments that are heat shrunken in a direction to draw said rows towards each other so that the resilient non-contracted intermediate fabric is held corrugated by the contracted top and bottom fabrics, and this corrugated fabric holds the top and bottom fabrics yieldingly spaced apart with sufficient strength to support a weight of one-half pound to the square inch without reducing the thickness of the corrugated fabric as much as 50 per cent.

4. The method of making a triple-ply corrugated fabric which comprises, weaving simultaneously heat shrinkable top and bottom fabrics each containing oriented heat-shrinkable synthetic filaments and a much stiffer but resilient and substantially non-shrinkable intermediate fabric formed largely of coarse synthetic yarns so as to unite the intermediate fabric with the top fabric and bottom fabric along spaced rows, then heating this triple-ply fabric sufficiently to permanently shrink the top and bottom fabrics a substantial amount relatively to the intermediate fabric in a direction to draw said rows towards each other to thereby corrugate the intermediate fabric with the corrugated loops secured alternately to the top and bottom fabric and adapted to support a [substantial] load *of one-half pound per square inch* without causing the corrugations to *completely* flatten out.

5. The method of making a triple-ply corrugated fabric which comprises, weaving simultaneously heat shrinkable top and bottom fabrics each containing oriented heat-shrinkable synthetic filaments and a much stiffer but resilient and substantially non-shrinkable intermediate fabric formed largely of coarse synthetic yarns so as to unite the intermediate fabric with the top fabric and bottom fabric along spaced rows, then heating this triple-ply fabric sufficiently to permanently shrink the top and bottom fabrics a substantial amount relatively to the intermediate fabric in a direction to draw said rows towards each other to thereby corrugate the intermediate fabric with the corrugated loops secured alternately to the top and bottom fabric so that these corrugations will not be *completely* flattened out by a pressure of one-half pound per square inch on the corrugated fabric.

*6. A multi-ply corrugated fabric, comprising a woven first fabric containing oriented synthetic filaments, a much stiffer woven, resilient non-elastic fabric formed largely of coarse synthetic monofilaments and woven to the first fabric along spaced rows, the first fabric being permanently contracted a substantial amount by the oriented filaments that are heat shrunken in a direction to draw said rows toward each other so that the resilient non-contracted non-elastic fabric is held corrugated by the contracted first fabric, and this corrugated fabric holds the first fabric yieldingly spaced from a plane parallel to the first fabric and tangent to the crests of the corrugations of the second fabric with sufficient strength to keep a weight of one-half pound per square inch from completely flattening out the corrugations.*

*7. A multi-ply corrugated fabric, comprising a woven first fabric containing oriented synthetic filaments, a second woven, non-elastic, resilient fabric woven to the first fabric along spaced rows, the first fabric being permanently contracted a substantial amount by the oriented filaments that are heat shrunken in a direction to draw said rows toward each other so that the resilient non-contracted non-elastic fabric is held corrugated by the contracted first fabric, and this corrugated fabric holds the first fabric yieldingly spaced from a plane parallel to the first fabric and tangent to the crests of the corrugations of the second fabric with sufficient strength to keep a weight of ½ pound per square inch from completely flattening out the corrugations.*

*8. A multi-ply corrugated fabric, comprising a woven first fabric containing oriented synthetic filaments, a second woven non-elastic resilient fabric woven to the first fabric along spaced rows, the first fabric being permanently contracted a substantial amount by the oriented filaments that are heat shrunken in a direction to draw said rows toward each other so that the resilient non-contracted non-elastic fabric is held corrugated by the first fabric, and this corrugated fabric holds the first fabric yieldingly spaced from a plane parallel to the first fabric and tangent to the crests of the corrugations of the second fabric with sufficient strength to keep a weight of 2 pounds per square inch from completely flattening out the corrugations.*

*9. A multi-ply corrugated fabric, comprising a woven first fabric containing oriented synthetic filaments, a second woven non-elastic resilient fabric woven to the first fabric along spaced rows, the first fabric being permanently contracted a substantial amount by the oriented filaments that are heat shrunken in a direction to draw said rows toward each other so that the resilient non-contracted non-elastic fabric is held corrugated by the first fabric, and this corrugated fabric holds the first fabric spaced from a plane parallel to the first fabric and tangent to the crests of the corrugations of the second fabric resiliently to resist lateral compression with sufficient strength to keep a weight of 2 pounds per square inch from completely flattening out the corrugations.*

References Cited in the file of this patent or the original patent

UNITED STATES PATENTS

| | | |
|---|---|---|
| 2,072,152 | Blake et al. | Mar. 2, 1937 |
| 2,184,751 | Nathanson | Dec. 26, 1939 |
| 2,213,125 | Hubert et al. | Aug. 27, 1940 |
| 2,231,388 | Kahil | Feb. 11, 1941 |
| 2,277,782 | Rugeley | Mar. 31, 1942 |
| 2,312,089 | Gobeille | Feb. 23, 1943 |
| 2,379,881 | Chamberlain | July 10, 1945 |
| 2,391,950 | Croft | Jan. 1, 1946 |
| 2,401,830 | Kahil | June 11, 1946 |

FOREIGN PATENTS

| | | |
|---|---|---|
| 268,166 | Great Britain | Mar. 31, 1927 |

OTHER REFERENCES

"Vinyon" by Frederic Bonnet, Industrial and Engineering Chemistry, December 1940, pages 1564–1567.

UNITED STATES PATENT OFFICE

CERTIFICATE OF CORRECTION

Reissue
Patent No. 24,007

May 24, 1955

Boutwell H. Foster

It is hereby certified that error appears in the printed specification of the above numbered patent requiring correction and that the said Letters Patent should read as corrected below.

Column 6, line 1, the printed matter beginning with "1. A" and ending with "pressure." in line 18, should appear in heavy brackets, indicating that said claim 1 has been canceled in the above numbered Reissue Patent.

Signed and sealed this 5th day of July, 1955.

(SEAL)
Attest:

E. J. MURRY
Attesting Officer

ROBERT C. WATSON
Commissioner of Patents